(12) United States Patent
Eccles et al.

(10) Patent No.: US 8,261,612 B2
(45) Date of Patent: Sep. 11, 2012

(54) ACCUMULATOR WITH BOTH DIRECT AND REMOTE QUANTITY LEVEL INDICATION

(75) Inventors: Steven R. Eccles, Torrance, CA (US); Filip Reinis, Long Beach, CA (US); Amanda L. Anthony, San Pedro, CA (US); Mike M. Masoudipour, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 320 days.

(21) Appl. No.: 12/797,784

(22) Filed: Jun. 10, 2010

(65) Prior Publication Data

US 2011/0303003 A1 Dec. 15, 2011

(51) Int. Cl.
*G01F 23/00* (2006.01)
(52) U.S. Cl. ............ 73/290 R; 73/305; 73/308; 73/309; 73/313; 73/317; 73/318; 73/321
(58) Field of Classification Search ................. 73/290 R, 73/305, 308, 309, 313, 317, 318, 321
See application file for complete search history.

(56) References Cited

U.S. PATENT DOCUMENTS

| | | | |
|---|---|---|---|
| 3,459,042 A * | 8/1969 | Brown ............................ | 73/313 |
| 3,559,727 A | 2/1971 | Hill et al. | |
| 3,677,334 A | 7/1972 | Bathla et al. | |
| 4,244,219 A * | 1/1981 | Takahashi ...................... | 73/309 |
| 4,305,284 A | 12/1981 | Rybicki et al. | |
| 4,355,280 A | 10/1982 | Duzich | |
| 4,527,107 A * | 7/1985 | van der Pol et al. .......... | 318/642 |
| 5,649,450 A * | 7/1997 | Glab et al. ...................... | 73/307 |
| 6,708,562 B2 * | 3/2004 | Kruger et al. ................... | 73/314 |
| 6,742,396 B2 * | 6/2004 | Schenk, Jr. ...................... | 73/735 |
| 7,117,740 B2 | 10/2006 | Reinis | |
| 7,168,313 B2 * | 1/2007 | Reinis et al. ................. | 73/290 R |

* cited by examiner

*Primary Examiner* — Hezron E Williams
*Assistant Examiner* — Hoang Nguyen
(74) *Attorney, Agent, or Firm* — Shimokaji & Assoc., PC

(57) ABSTRACT

An apparatus for determining the fluid level of a container, such as an accumulator, may include both a remote quantity indicator and a direct quantity indicator. The remote quantity indicator may include a remote dial at the end of a flexible cable or an electrical signal receiver receiving an electrical signal from a rotary variable differential transformer (RVDT), such as a potentiometer. The RVDT type of indicator may include an electrical connector on the accumulator to attach an electrical cable to carry the quantity level signal. The direct quantity indicator may include a dial directly mounted on the accumulator. The remote/direct quantity indicators may include, for example, one of the following three combinations: 1) a dial directly on the accumulator and a remote dial at the end of a flexible cable; 2) an RVDT output and a dial directly on the accumulator; and 3) an RVDT output on an accumulator, a remote dial at the end of a flexible cable and a dial directly on the accumulator.

14 Claims, 6 Drawing Sheets

ACCUMULATOR WITH BOTH DIRECT AND REMOTE QUANTITY LEVEL INDICATION

BACKGROUND OF THE INVENTION

The present invention generally relates to methods and apparatus for determining the fluid level of a container, such as an accumulator, and more specifically, to methods and apparatus for determining the fluid level of a container without the need for either electrical power or a direct line of sight to the container.

Accumulators are frequently used on military and commercial aircraft to accommodate the thermal expansion of coolant and hydraulic fluids. During aircraft servicing, maintenance personnel need to ascertain if the accumulator contains the appropriate fluid level. Often, the accumulator is located in an inconvenient space for visual inspection and there is no aircraft electrical power available to operate a level sensor. Fluid volume, or level, is one of the primary service needs of these types of systems.

One of the methods of monitoring the fluid volume has been a dial or gage directly mounted on the accumulator. This type of indicator would allow a direct reading of the accumulator piston's stroke with either a window to see the piston, or possibly a cable and drum system attached to the piston. This type of directly mounted gage is typically used by the technician during refilling of the accumulator. For periodic inspection and monitoring of fluid level, however, the directly mounted gage may be difficult to access by the technician.

Another method of monitoring the fluid volume in an accumulator is to have a remote quantity indicator. This can either be a mechanical or electrical type of indicator. A remote fluid volume indicator could prove to be better for periodic inspection, but may not be the preferred indicator for a service technician.

As can be seen, there is a need for a quantity level indicator for an accumulator that can indicate the fluid level both directly and indirectly.

SUMMARY OF THE INVENTION

In one aspect of the present invention, a fluid quantity indicator comprises a first fluid quantity readout device remote from a container containing a fluid to be measured, the first fluid quantity readout device adapted to provide a first indication of the level of fluid in the container; and a second fluid quantity readout device located at the container, the second fluid quantity readout device adapted to provide a second indication of the level of fluid in the container.

In another aspect of the present invention, a fluid quantity indicator comprises a shaft; a potentiometer attached to a first end of the shaft, wherein rotation of the shaft operates to dial the potentiometer; a rewind spring attached to a second end of the shaft; a cable tensioned by the rewind spring, the cable operable to move with changing fluid levels in a container; a dial attached to the rewind spring, the dial positioned to be viewable from outside of the container; a first fluid quantity readout device remote from the container, the first fluid quantity readout device adapted to provide a first indication of the level of fluid in the container; and a second fluid quantity readout device located at the container, the second fluid quantity readout device adapted to provide a second indication of the level of fluid in the container.

In a further aspect of the present invention, a method for measuring of a fluid level in a container comprises providing a local fluid level measurement device at the container; and providing a remote fluid level measurement device away from the container.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide methods and apparatus for determining the fluid level of a container, such as an accumulator. A remote quantity indicator may include a remote dial at the end of a flexible cable or an electrical signal receiver receiving an electrical signal from a rotary variable differential transformer (RVDT), such as a potentiometer. The RVDT type of indicator may include an electrical connector on the accumulator to attach an electrical cable to carry the quantity level signal. The direct quantity indicator may include a dial directly mounted on the accumulator. The remote/direct quantity indicators may include, for example, one of the following three combinations: 1) a dial directly on the accumulator and a remote dial at the end of a flexible cable; 2) an RVDT output and a dial directly on the accumulator; and 3) an RVDT output on an accumulator, a remote dial at the end of a flexible cable, and a dial directly on the accumulator.

Figure 1:
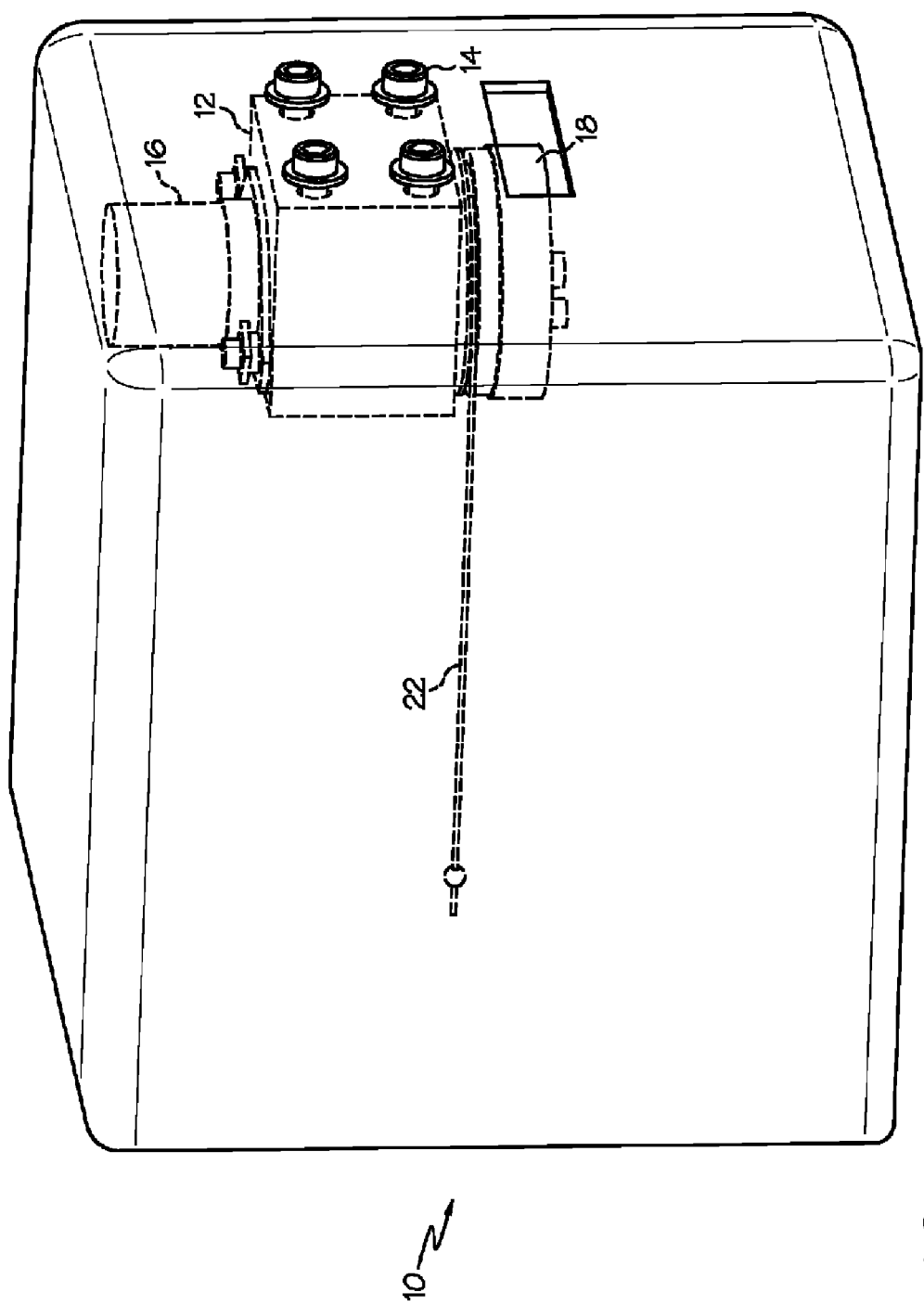
FIG. 1 is a perspective view of a portion of an accumulator having direct and remote quantity level indication, according to an embodiment of the present invention.
Figure 2:
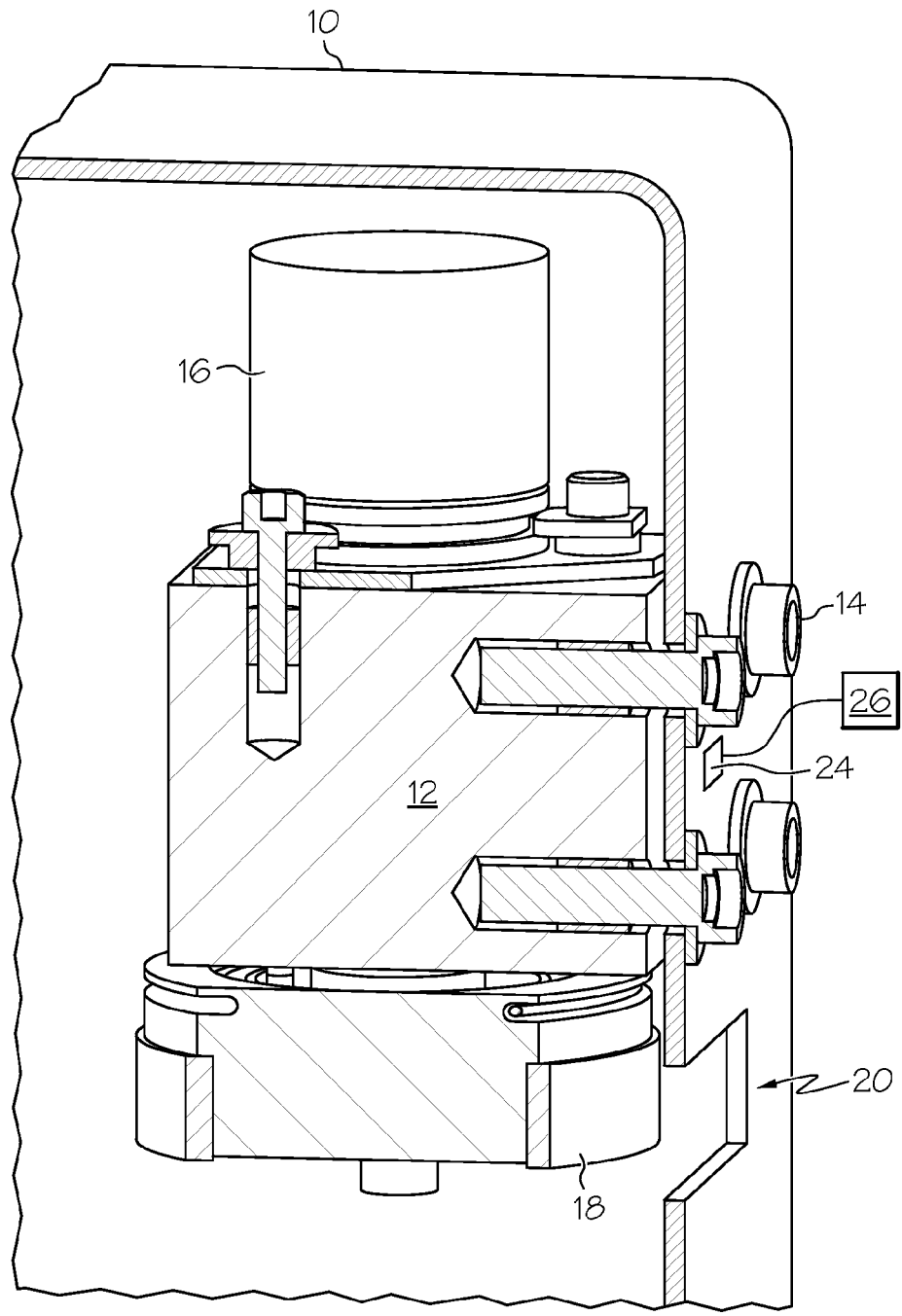
FIG. 2 is a cross-sectional view of a portion of the accumulator of FIG. 1.

Referring to FIGS. 1 and 2, a container, such as an accumulator 10 may include a fluid quantity indicator 12 mounted inside the accumulator 10 with fasteners 14. The fluid quantity indicator 12 may include a rotary potentiometer 16 for generating an electronic signal indicative of the fluid level in the accumulator 10. The potentiometer 16 may deliver a signal to a port 24 external to the accumulator 10. A fluid level readout device 26 may be electrically connected either directly to the potentiometer 16 or electrically connected to the potentiometer 16 via the port. The fluid level readout device 26 may indicate the fluid level in the accumulator 10. The fluid level readout device 26 may be local to the accumulator 10 or may be remote, for example, in a cockpit of an aircraft. In one embodiment of the present invention, multiple fluid level readout devices 26 may be installed both local and remote relative to the accumulator 10. In one embodiment of the present invention, the potentiometer 16 may deliver the signal to the fluid level readout device 26 via a wireless communication protocol. The signal from the potentiometer 16 may connect to an on-board computer on an aircraft.

The fluid quantity indicator 12 may further include a fluid level dial 18. The fluid level dial 18 may be visible through a window 20 in the accumulator 10. The fluid level dial 18 may indicate the fluid level in the accumulator 10 through movement of a tensioned cable 22 within the accumulator 10. The tensioned cable 22 may attach to the fluid quantity indicator 12 at one end thereof and may attach to a diaphragm, bellows, or piston (not shown) of the accumulator 10 at the other end thereof.

Figure 3:
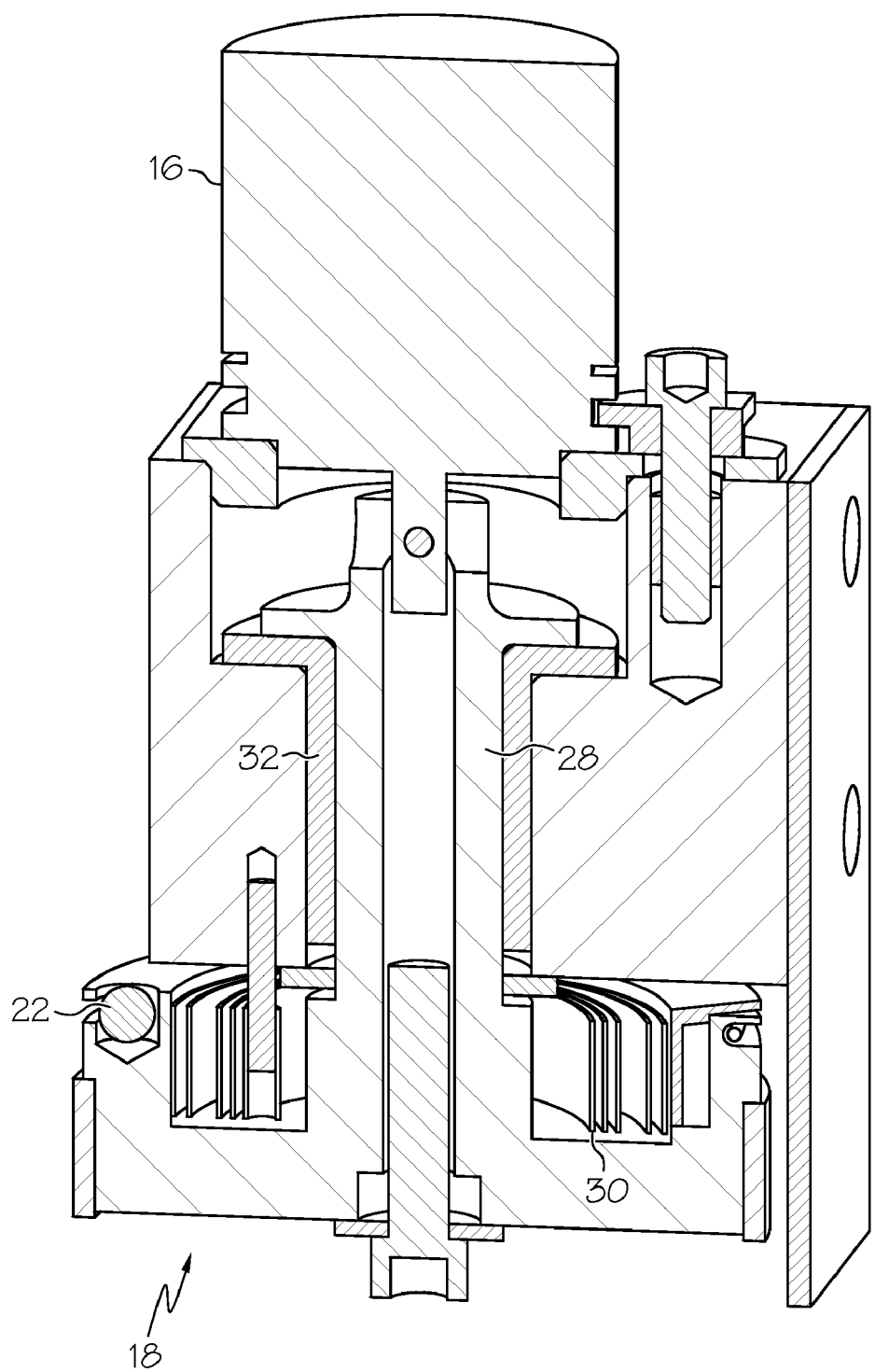
FIG. 3 is a cross-sectional view of an exemplary quantity indicator according to an embodiment of the present invention.

FIG. 3 shows a cross-sectional view of the fluid quantity indicator 12. The potentiometer 16 may be dialed via a shaft 28. In other words, an output signal of the potentiometer 16 may vary depending on the rotation of the shaft 28. The shaft 28 may be rotationally attached to a rewind spring 30 that provides tension on the cable 22. The shaft 28 may be supported by a bearing 32, such as a polytetrafluoroethylene (PTFE) lined bearing.

Figure 4:
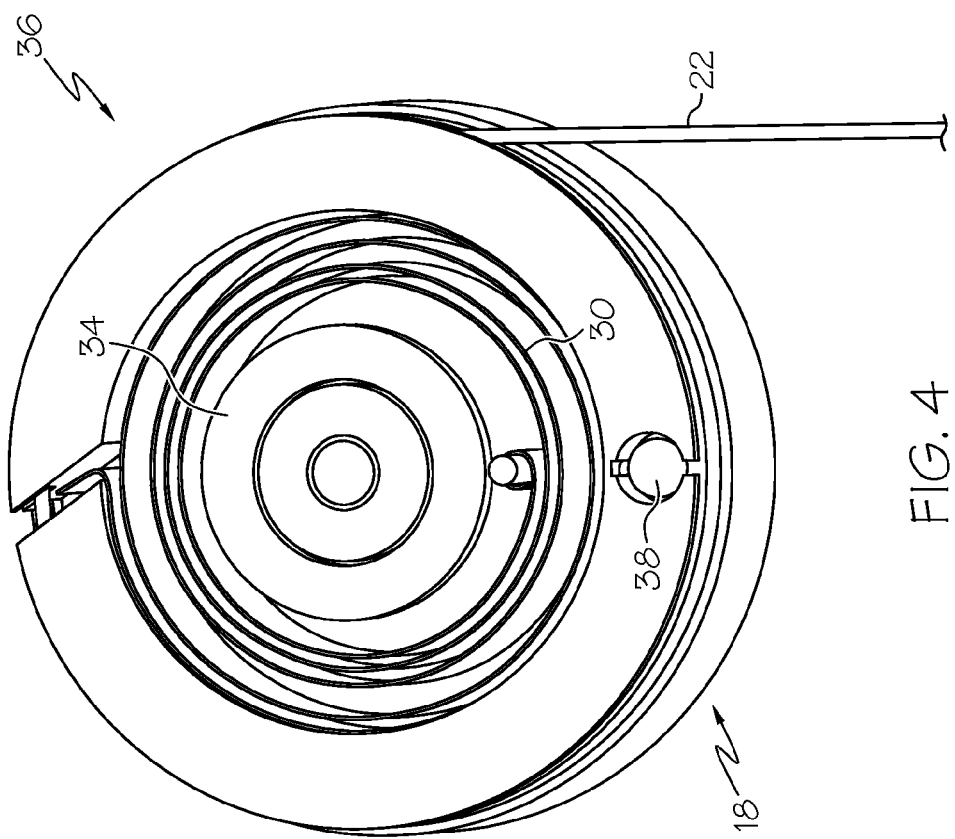
FIG. 4 is a perspective view of a quantity indicator drum according to an embodiment of the present invention.

FIG. 4 shows a close-up view of the rewind spring 30. A thrust washer 34 may attach to a drum assembly 36 and to the shaft 28 (see FIG. 3). The rewind spring 30 and drum assembly 36 may provide rotational resistance and recoil to the cable 22. The cable 22 may connect to the rewind spring 30 via a swaged ball 38 at an end of the cable 22. The rewind spring 30 may attach to one side of the fluid level dial 18 via the drum assembly 36.

Figure 5:
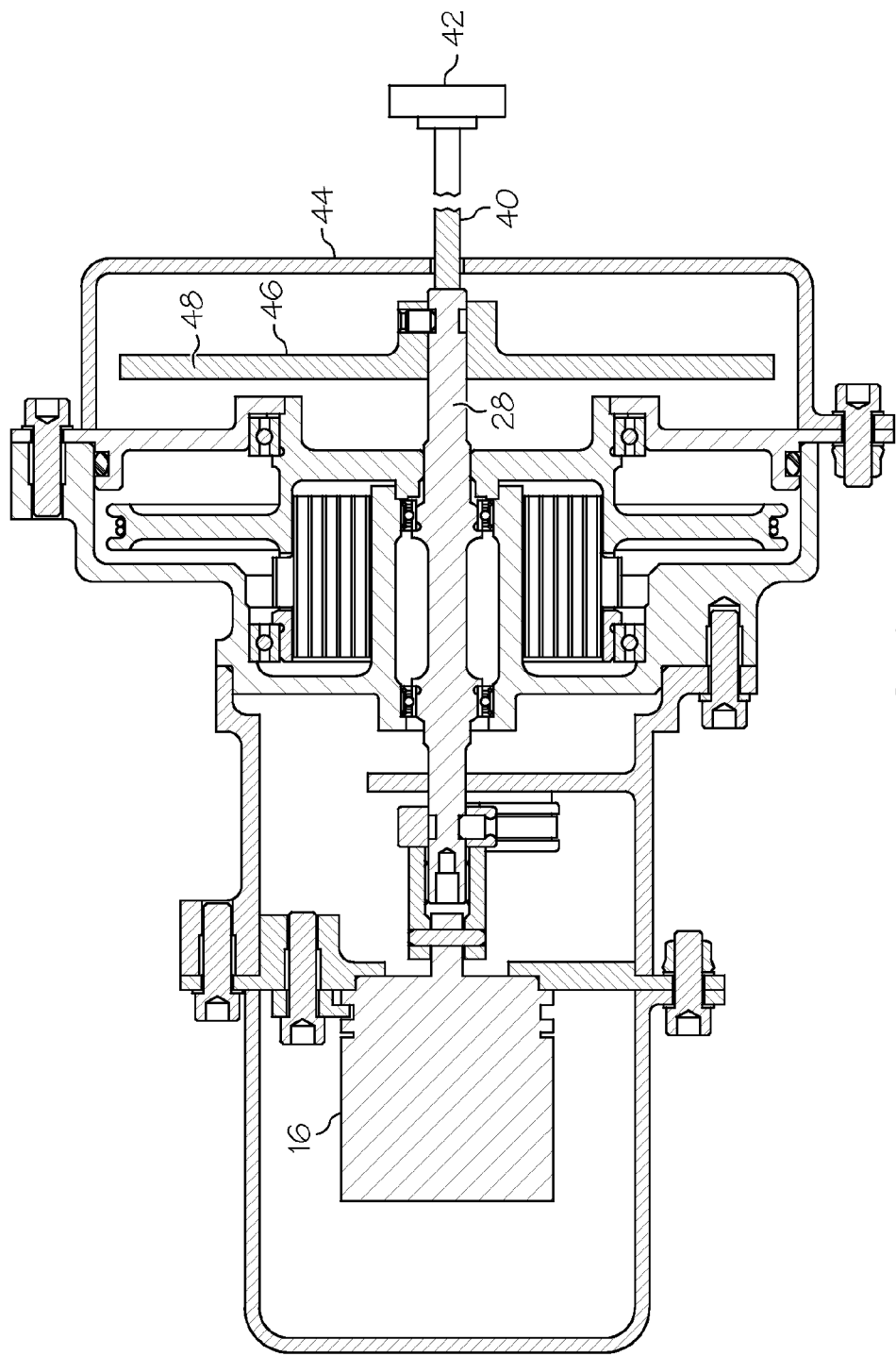
FIG. 5 is a cross-sectional view of a quantity indicator according to an alternate embodiment of the present invention.

The above described embodiments, with reference to FIGS. 1 through 4, describe various methods for local and remote measurement of fluid in an accumulator. For example, local measurement of fluid level may be made through the fluid level dial 18 and/or the potentiometer 16. Remote measurement of fluid level may be made through the potentiometer 16. The potentiometer 16, however, may be optional, as remote measurement may be made through a flexible cable 40 attached to the shaft 28, as shown in FIG. 5. One end of the flexible cable 40 may attach to the shaft 28 and the other end of the flexible cable 40 may attach to a remote fluid indicator 42. The flexible cable 40 and remote indicator 42 may be similar to that of commonly owned U.S. Pat. No. 7,168,313 or 7,117,740, herein incorporated by reference. The remote indicator 42 may provide remote fluid measurement in lieu of, or in addition to, the fluid level readout device 26.

Still referring to FIG. 5, in an alternate embodiment of the present invention, an indicator window 44 may cover a front face 46 of an indicator disk and dial 48. The indicator disk and dial 48 may be attached to the shaft 28 to provide a local readout of fluid level through the window 44. The potentiometer 16 may attach to the shaft 28 at an end opposite that of the indicator disk and dial 48.

Figure 6:
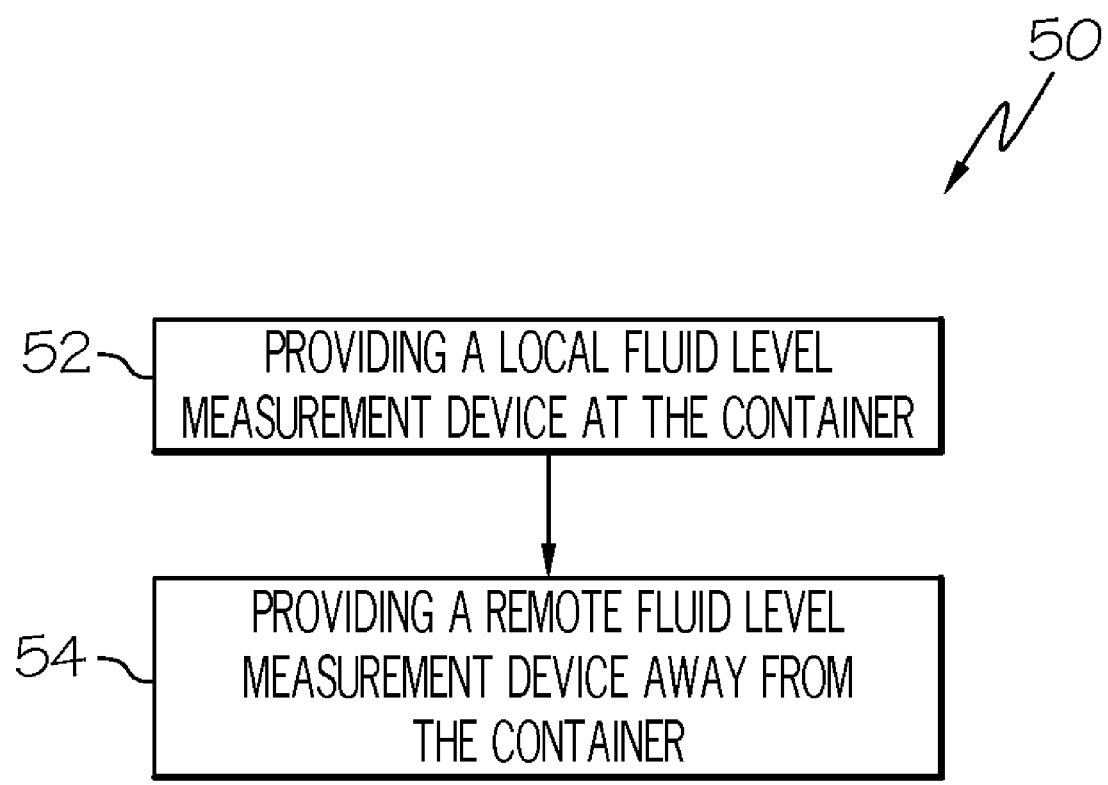
FIG. 6 is a flow chart describing a method according to an embodiment of the present invention.

Referring to FIG. 6, a method 50 for measuring of a fluid level in a container may include a step 52 of providing a local fluid level measurement device at the container. This local fluid level measurement device may be a readout from a potentiometer of a fluid quantity indicator or a readout from a dial attached to the fluid quantity indicator. The method 50 may further include a step 54 of providing a remote fluid level measurement device away from the container. This remote fluid level measurement device may be a mechanical readout on a remote dial or the remote fluid level measurement device may be an electrical readout from a potentiometer of the fluid quantity indicator. In some embodiments of the present invention, multiple readouts may be provided. For example, a rotary remote indicator may be provided at one remote location for use by a ground crew to check fluid levels prior to flight of an aircraft. A potentiometer-based readout may be provided at another remote location, such as a cockpit of an aircraft, to provide pilots with a readout of fluid levels. Finally, a local indicator, such as a direct dial indicator, may be provided at the accumulator for a technician to read while filling the fluid tank.

It should be understood, of course, that the foregoing relates to exemplary embodiments of the invention and that modifications may be made without departing from the spirit and scope of the invention as set forth in the following claims.

We claim:

1. A fluid quantity indicator for a fluid accumulator of an aircraft comprising:
    a first fluid quantity readout device remote from the accumulator, the first fluid quantity readout device adapted to provide a first indication of the level of fluid in the accumulator; and
    a second fluid quantity readout device located at the accumulator, the second fluid quantity readout device adapted to provide a second indication of the level of fluid in the accumulator,
    wherein the second fluid quantity readout device includes a cable tensioned by a rewind spring, the cable operable to move with changing fluid levels in the accumulator and a dial attached to the rewind spring, the dial positioned to be viewable from outside of the accumulator.

2. The fluid quantity indicator of claim 1, wherein the first fluid quantity readout device is a remote rotary readout device.

3. The fluid quantity indicator of claim 1, further comprising a potentiometer attached to a shaft, wherein movement of the shaft corresponds to changes in fluid level within the accumulator.

4. The fluid quantity indicator of claim 1, wherein an output signal of the potentiometer is delivered to a third fluid quantity readout device remote from the accumulator, the third fluid quantity readout device adapted to provide a third indication of the level of fluid in the accumulator.

5. The fluid quantity indicator of claim 1, wherein the cable is attached to a bellows within the accumulator, the cable turning a shaft of the rewind spring.

6. A fluid quantity indicator comprising:
    a shaft;
    a potentiometer attached to a first end of the shaft, wherein rotation of the shaft operates to dial the potentiometer;
    a rewind spring attached to a second end of the shaft;
    a cable tensioned by the rewind spring, the cable operable to move with changing fluid levels in a container;
    a dial attached to the rewind spring, the dial positioned to be viewable from outside of the container;
    a first fluid quantity readout device remote from the container, the first fluid quantity readout device adapted to provide a first indication of the level of fluid in the container; and
    a second fluid quantity readout device located at the container, the second fluid quantity readout device adapted to provide a second indication of the level of fluid in the container.

7. The fluid quantity indicator of claim 6, wherein the first fluid quantity readout device receives an output from the potentiometer.

8. The fluid quantity indicator of claim 6, wherein the first fluid quantity readout device is a remote rotary readout device.

9. The fluid quantity indicator of claim 6, wherein the second fluid quantity readout device is the dial.

10. The fluid quantity indicator of claim 6, further comprising a third fluid quantity readout device remote from the container, the third fluid quantity readout device adapted to provide a third indication of the level of fluid in the container.

11. The fluid quantity indicator of claim 6, wherein:

the first fluid quantity readout device is a remote rotary readout device;

the second fluid quantity readout device is the dial; and the third fluid quantity readout device receives an output from the potentiometer.

12. A method for measuring of a fluid level in a container, the method comprising:

moving an end of a cable tensioned by a rewind spring, the cable end operable to move with changing fluid levels in a container;

rotating a dial attached to the rewind wring, the dial positioned to be viewable from outside of the container to provide a local fluid level measurement device at the container; and providing a remote fluid level measurement device away from the container.

13. The method of claim 12, wherein the remote fluid level measurement device is a mechanical readout on a remote dial.

14. The method of claim 13, wherein the remote fluid level measurement device further includes an electrical readout from a potentiometer of a fluid quantity indicator within the container.

* * * * *